United States Patent [19]
Cupples

[11] Patent Number: 5,165,823
[45] Date of Patent: Nov. 24, 1992

[54] PORTABLE DOCK APPARATUS

[76] Inventor: Winford L. Cupples, 28490 Ave. 13½, Madera, Calif. 93638

[21] Appl. No.: 715,617

[22] Filed: Jun. 14, 1991

[51] Int. Cl.⁵ .......................... B63C 1/00; E01D 1/00
[52] U.S. Cl. .................................. 405/219; 405/220; 405/218; 14/71.5
[58] Field of Search .............. 405/219, 220, 221, 218; 14/69.5, 71.5

[56] References Cited
U.S. PATENT DOCUMENTS

| | | | |
|---|---|---|---|
| 2,933,149 | 4/1960 | Lee | 14/71.5 X |
| 3,999,397 | 12/1976 | Albery | 14/69.5 X |
| 4,142,477 | 3/1979 | Powers | 405/219 X |
| 4,287,625 | 9/1981 | Dawson | 405/219 X |
| 4,581,784 | 4/1986 | Rousseau et al. | 405/219 X |
| 4,645,380 | 2/1987 | Hambrick et al. | 405/220 |
| 4,838,735 | 6/1989 | Warner | 405/218 X |
| 4,938,629 | 7/1990 | Boudrias | 405/219 X |
| 4,968,182 | 11/1990 | Westwell | 405/221 X |

Primary Examiner—Randolph A. Reese
Assistant Examiner—J. Russell McBee
Attorney, Agent, or Firm—Leon Gilden

[57] ABSTRACT

A first plate pivotally mounted to a second plate is secured to a shoreline, wherein the second plate includes a central bore rotatably receiving a bridge plate axle therethrough, wherein the bridge plate axle is mounted orthogonally oriented relative to a plurality of parallel pontoons, wherein the pontoons include forward pointed ends and rear rudders to permit pivotment of the pontoons within the second plate accommodating various directions of current flow. The organization includes boat hook members mounted to a forward flange of the second plate for temporary securement of a boat thereto.

6 Claims, 4 Drawing Sheets

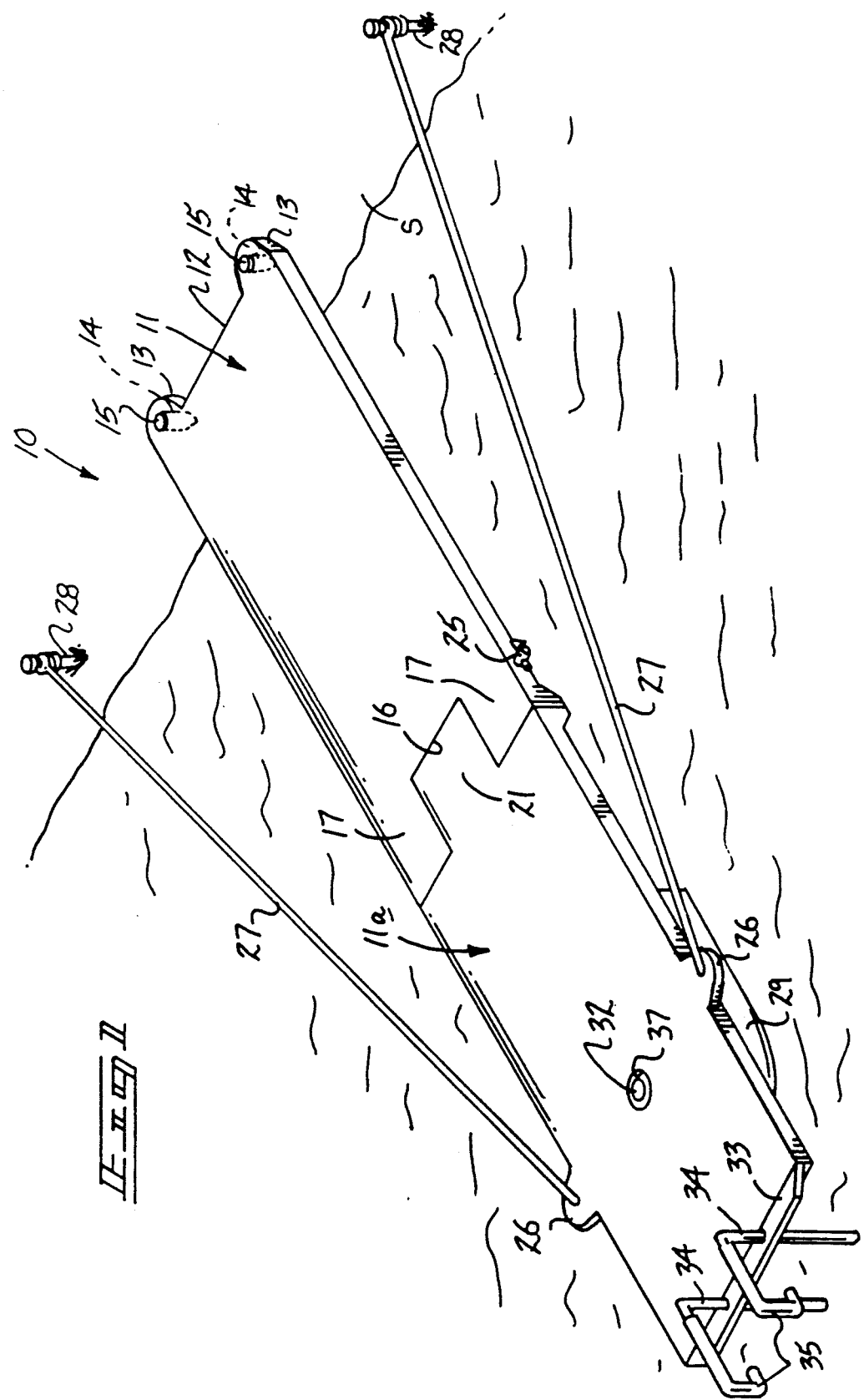

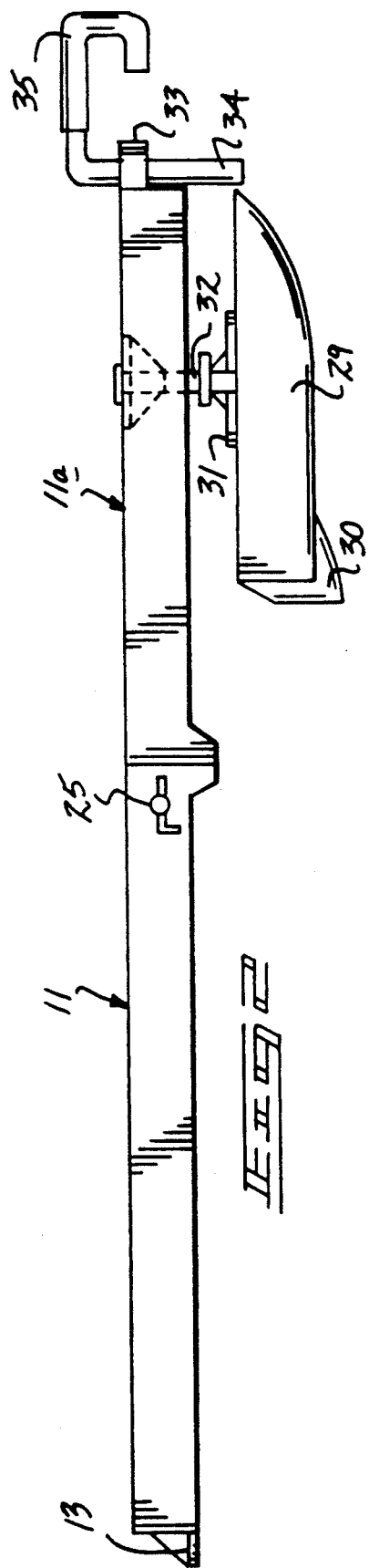
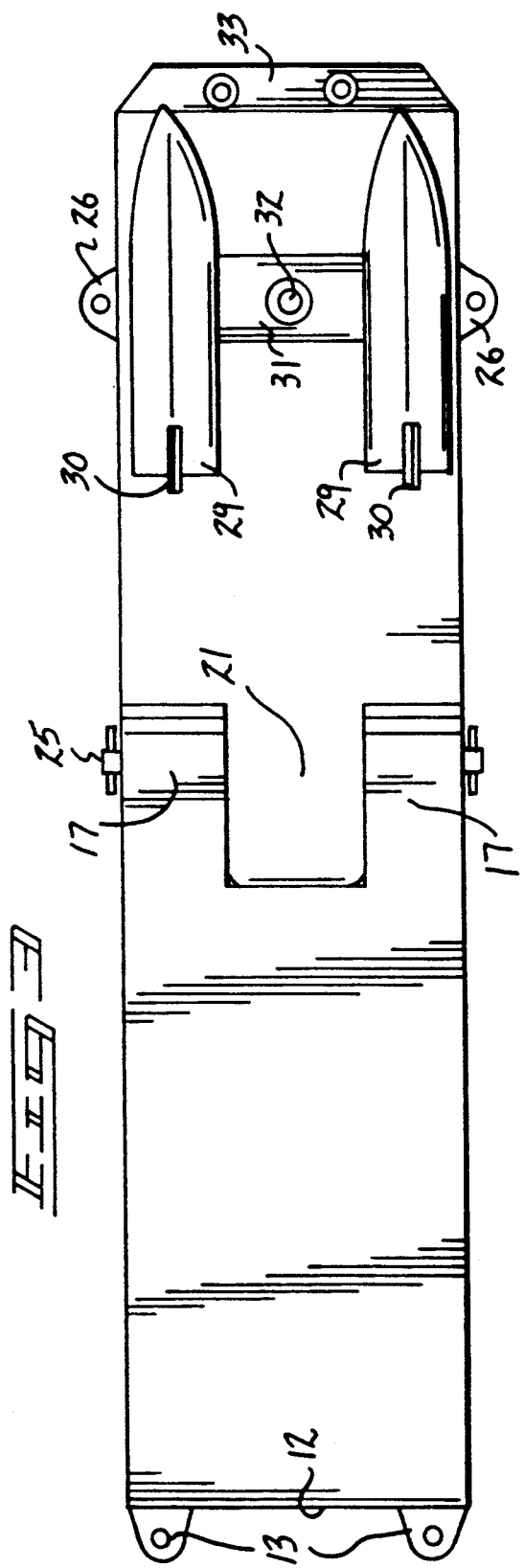

5,165,823

PORTABLE DOCK APPARATUS

BACKGROUND OF THE INVENTION

1. Field of the Invention

The field of invention relates to dock apparatus, and more particularly pertains to a new and improved portable dock apparatus wherein the same is arranged for convenient and immediate mounting relative to a shoreline.

2. Description of the Prior Art

Relative cost and time are significant factors in the construction of dock apparatus. To utilize a boat within a lake or a body of water including a shoreline, a dock structure is typically required to position an anchored boat in a spaced relationship relative to the associated shoreline. Prior art structure has been available for use of portable dock apparatus and is exemplified in U.S. Pat. No. 4,287,625 to Dawson wherein a boat dock utilizes a plurality of flotation members for mounting the dock within the water relative to the shoreline.

U.S. Pat. No. 4,838,735 to Warner sets forth a floating pier encasing various pontoon members for flotation of the pier relative to the shoreline.

U.S. Pat. No. 4,938,629 to Boudrias sets forth a modular wharf, wherein the wharf is formed of hollow shells mounted relative to one another to create a dock structure.

U.S. Pat. No. 4,581,784 to Rousseau, et al. provides a ramp apparatus wherein a pier fixedly mounted relative to a shoreline includes a ramp structure directed downwardly to a flotation member.

Accordingly, it may be appreciated that there continues to be a need for a new and improved portable dock apparatus as set forth by the instant invention which addresses both the problems of ease of use as well as effectiveness in construction in providing immediate and effective positioning of a dock relative to a shoreline and in this respect, the present invention substantially fulfills this need.

SUMMARY OF THE INVENTION

In view of the foregoing disadvantages inherent in the known types of dock apparatus now present in the prior art, the present invention provides a portable dock apparatus wherein the same is arranged for convenience of mounting of a dock structure relative to a shoreline. As such, the general purpose of the present invention, which will be described subsequently in greater detail, is to provide a new and improved portable dock apparatus which has all the advantages of the prior art dock apparatus and none of the disadvantages.

To attain this, the present invention provides a first plate pivotally mounted to a second plate and secured to a shoreline, wherein the second plate includes a central bore rotatably receiving a bridge plate axle therethrough, wherein the bridge plate axle is mounted orthogonally oriented relative to a plurality of parallel pontoons, wherein the pontoons include forward pointed ends and rear rudders to permit pivotment of the pontoons within the second plate accommodating various directions of current flow. The organization includes boat hook members mounted to a forward flange of the second plate for temporary securement of a boat thereto.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable dock apparatus which has all the advantages of the prior art dock apparatus and none of the disadvantages.

It is another object of the present invention to provide a new and improved portable dock apparatus which may be easily and efficiently manufactured and marketed.

It is a further object of the present invention to provide a new and improved portable dock apparatus which is of a durable and reliable construction.

An even further object of the present invention is to provide a new and improved portable dock apparatus which is susceptible of a low cost of manufacture with regard to both materials and labor, and which accordingly is then susceptible of low prices of sale to the consuming public, thereby making such portable dock apparatus economically available to the buying public.

Still yet another object of the present invention is to provide a new and improved portable dock apparatus which provides in the apparatuses and methods of the prior art some of the advantages thereof, while simultaneously overcoming some of the disadvantages normally associated therewith.

Still another object of the present invention is to provide a new and improved portable dock apparatus wherein the same is arranged for immediate mounting of the dock structure relative to a shoreline and utilizing directional pontoons to accommodate current flow in an underlying body of water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the instant invention.

FIG. 3 is an orthographic bottom view of the invention.

DESCRIPTION OF THE PREFERRED EMBODIMENT

Figure 4:
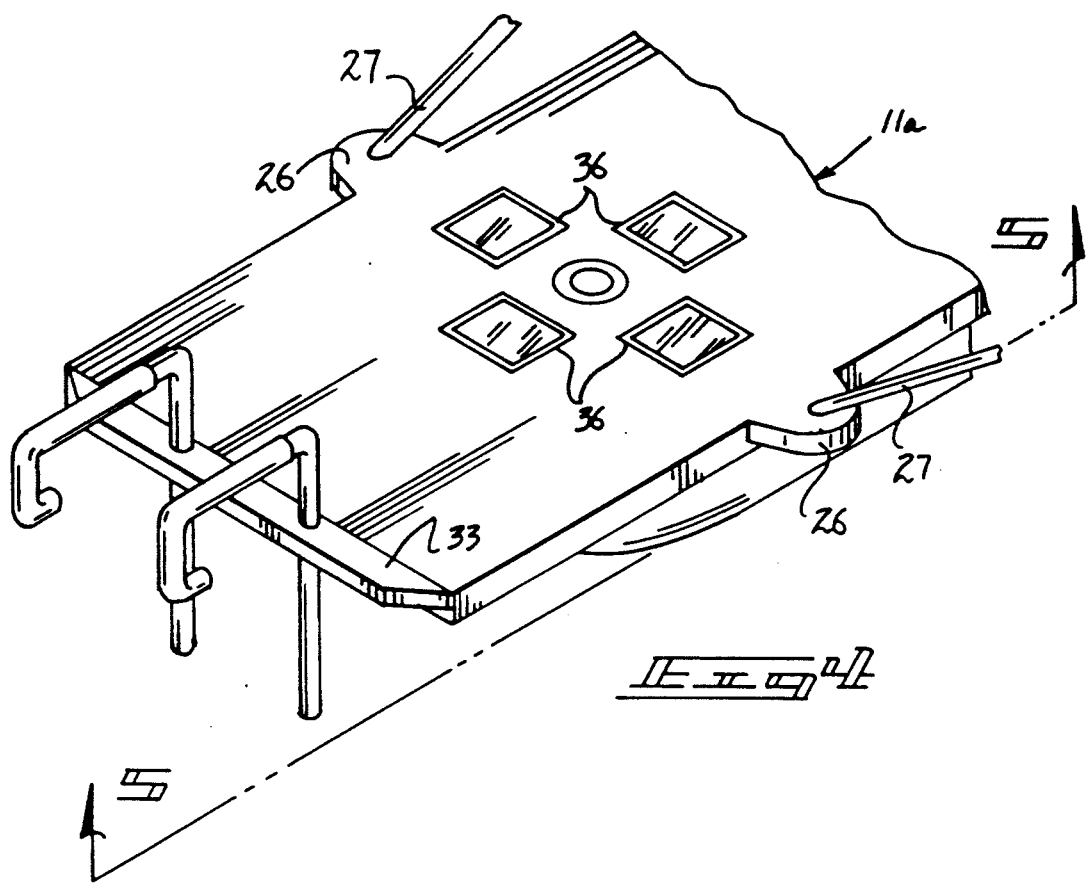
FIG. 4 is an isometric illustration of a modified second plate member utilized by the dock structure of the instant invention.

With reference now to the drawings, and in particular to FIGS. 1 to 7 thereof, a new and improved portable dock apparatus embodying the principles and concepts of the present invention and generally designated by the reference numeral 10 will be described.

More specifically, the portable dock apparatus 10 of the instant invention essentially comprises a rigid first plate 11 removably mounted to a second plate 11a. The first plate includes a first plate rear edge 12 spaced from a first plate forward edge 16. The first plate rear edge 12 includes a plurality of rear ear members 13, each including a rear mounting bore 14 directed therethrough receiving a mounting pin 15 directed through each of the mounting bores 14 for securement of the first plate 11 to the shoreline "S". First plate forward edge 16 includes a plurality of forward legs 17 spaced apart relative to one another to define a central recess 18 therebetween. Planar forward leg abutment surfaces 19 are orthogonally oriented relative to a top surface of the first plate 11, and are positioned for abutment with a second plate abutment flange 22 orthogonally mounted to a rear edge of the second plate 11a. A second plate projection 21 projecting medially of the second plate's rear edge is complementarily received within the recess 18. Each of the forward legs 17 includes an axle bore 23, wherein the axle bores 23 of each leg 17 are coaxially aligned relative to one another and are further coaxially aligned with a second plate projection bore 24 directed through the second plate projection 21. An axle 25 is accordingly directed through the bores 23 and the bore 24 for securement of the first plate 11 relative to the second plate 11a. The second plate includes second plate side wall ears 26, with one mounted to each side wall of the second plate 11a. A tether line 27 is thereafter mounted at a forward end to a second plate side wall ear 26 and to a rear end of the tether line to a tether line pin 28 that is mounted within the shoreline "S".

A plurality of elongate pontoons 29 are provided. The elongate pontoons 29 each include a forward pointed end and a pontoon rudder 30 aligned with a longitudinal axis of each pontoon mounted to a bottom surface of each pontoon, wherein a bridge plate 31 is fixedly mounted to a top surface of each pontoon to maintain the pontoons 29 in a parallel relationship relative to one another. A bridge plate axle 32 is orthogonally mounted medially of a top surface of the bridge plate 31 and is received through plate axle bore 37. The plate axle bore 37 is positioned medially between the side walls of the second plate 11a. As the plate axle 32 is rotatably mounted within the plate axle bore 37, the pontoons and their parallel relationship, as well as the use of rudder structure 30, rotate relative to a bottom surface of the second plate 11a dependent upon water currents in the underlying body of water relative to the portable dock apparatus 10.

A second plate forward flange 33 is mounted to a forward edge of the second plate 11a and includes flange pins 34 rotatably mounted through the flange, with each of the pins 34 including a "J" shaped leg 35 mounted at an upper terminal end thereof for securement within the bow of an associated boat (not shown) for securement of the boat in a temporary manner relative to the dock structure. The pins 34 are reciprocatably and slidably received within the flange to permit the pins to be lifted and thereafter directed downwardly relative to the flange, wherein the "J" shaped legs 35 are thereby projected within the hull of an associated boat to maintain the boat in an orientation of adjacency relative to the dock structure.

Figure 5:
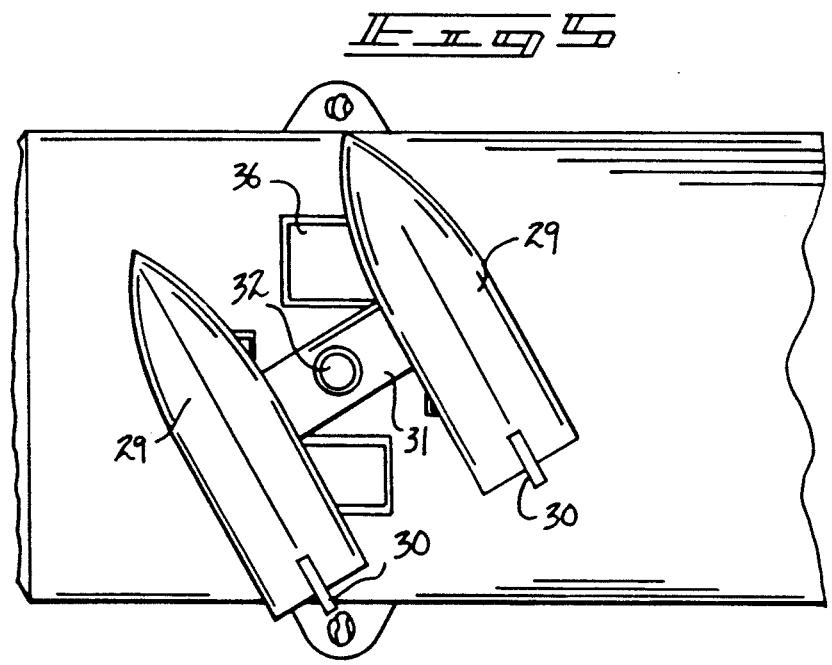
FIG. 5 is an orthographic bottom view of the modified second plate member, as illustrated in FIG. 4.
Figure 6:
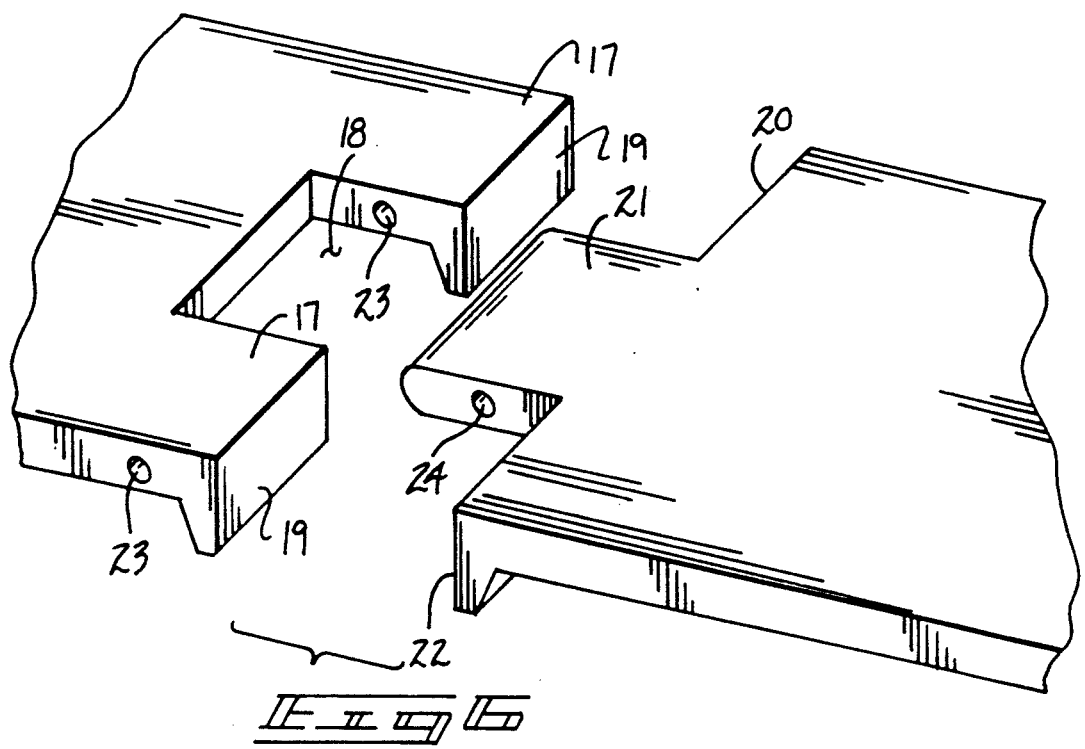
FIG. 6 is an isometric illustration illustrating the intercommunication of the first and second plates relative to one another.
Figure 7:
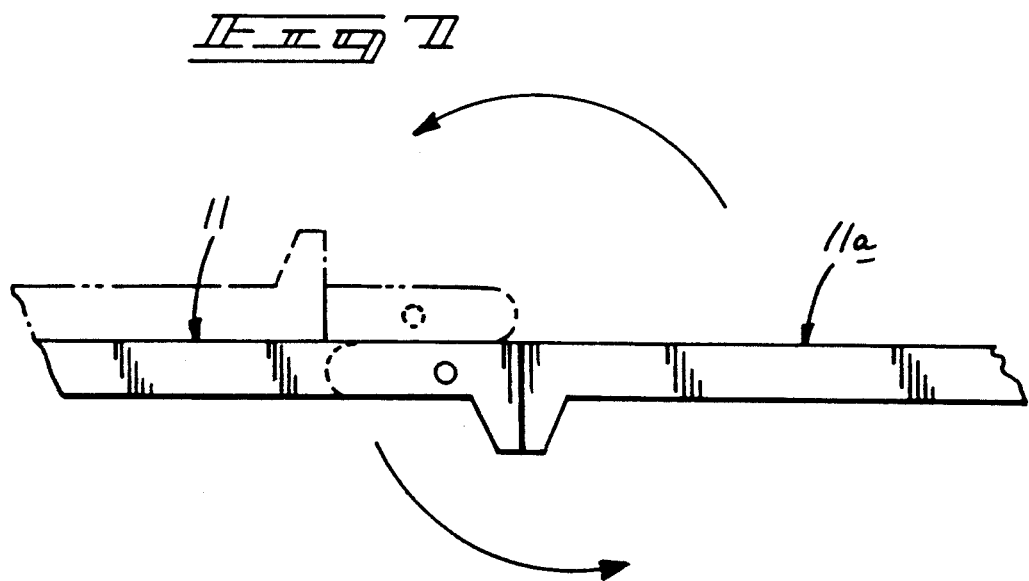
FIG. 7 is an orthographic side view depicting the second plate pivoted about the first plate for transport and storage thereof.

A modification of the invention is illustrated in the FIGS. 4 and 5, wherein plural pairs of transparent window plates 36 are mounted in a circumferentail relationship relative to the bridge plate axle 32 and its associated plate axle bore 37. In this manner, the transparent window plates 36 permit visual access to the orientation of the pontoons 29 to permit visual observation of water currents within the underlying body of water as a navigational aid in assisting an individual in launching a boat relative to the dock structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable dock apparatus, comprising,
    a rigid first plate longitudinally aligned with a rigid second plate, the first plate including a first plate rear edge, the first plate rear edge including a plurality of ear members, the ear members including ear member bores directed therethrough, and each bore including a mounting pin directed therethrough for mounting of the first plate rear edge relative to a shoreline, and the first plate including a first plate forward edge, the second plate including a second rear edge, wherein the first plate forward edge is mounted to the second plate rear edge, and the second plate including a second plate forward edge, the second plate forward edge including a flange plate, the flange plate including a plurality of flange bores directed therethrough, each flange bore slidably mounting a flange pin therethrough, and each flange pin including a "J" shaped leg mounted at an upper terminal end of each pin to permit positioning of each "J" shaped leg within a hull portion of a boat.

2. An apparatus as set forth in claim 1 wherein the first plate forward edge includes a plurality of forward legs, the forward legs spaced apart a predetermined spacing defining a central recess therebetween, and the second plate rear edge including a second plate projection, the second plate projection positioned orthogonally and medially relative to the second plate rear edge, wherein the second plate projection is complementarily received within the central recess, and each of the first plate forward legs including a leg bore directed therethrough, the leg bores are coaxially aligned relative to one another, and the second plate projection includes a projection bore, the projection bore coaxially aligned with the forward leg bores, and a first axle directed through the forward leg bores and the projection bore for securement of the first plate relative to the second plate.

3. An apparatus as set forth in claim 2 wherein each first plate leg includes a leg abutment surface orthogonally oriented relative to a top surface of the first plate, and the second plate rear edge includes a second plate projection, wherein the second plate projection is in contiguous communication with each leg abutment surface to maintain alignment of the first plate relative to the second plate.

4. An apparatus as set forth in clam 3 wherein the second plate includes a plurality of second plate side wall ears mounted to each side of the second plate, and each side wall ear includes a tether line, each tether line including a rear end, and each rear end secured to a tether line pin projected within the shoreline.

5. An apparatus as set forth in claim 4 wherein the second plate includes a plate axle bore positioned medially between opposed side walls of the second plate, and a plurality of pontoons, each pontoon including a forward pointed edge and a rudder mounted to a rear edge of each pontoon on a bottom surface thereof, and the pontoons are maintained in a parallel coextensive relationship relative to one another, and a bridge plate fixedly secured to a top surface of each pontoon, and the bridge including a bridge plate axle, the bridge plate axle rotatably received within the plate axle bore, wherein the pontoons are rotatably mounted relative to the second plate to accommodate water currents in a body of water underlying the first plate and the second plate.

6. An apparatus as set forth in claim 5 including a plurality of transparent windows circumferentially mounted through the second plate about the plate axle bore to permit visual observation of the pontoons and associated water currents within the underlying body of water.

* * * * *